(12) United States Patent
Lautenschlager et al.

(10) Patent No.: US 7,135,513 B2
(45) Date of Patent: Nov. 14, 2006

(54) BRANCHED ORGANOSILICON COMPOUNDS AS ANTIMISTING ADDITIVES FOR SILICONE COATING COMPOSITIONS

(75) Inventors: Hans Lautenschlager, Haiming (DE); Christian Herzig, Feichten-Waging (DE); Christine Weizhofer, Krichdorf (DE)

(73) Assignee: Wacker Chemie AG, Munich (DE)

( * ) Notice: Subject to any disclaimer, the term of this patent is extended or adjusted under 35 U.S.C. 154(b) by 43 days.

(21) Appl. No.: 10/506,656

(22) PCT Filed: Feb. 20, 2003

(86) PCT No.: PCT/EP03/01762

§ 371 (c)(1),
(2), (4) Date: Sep. 3, 2004

(87) PCT Pub. No.: WO03/074621

PCT Pub. Date: Sep. 12, 2003

(65) Prior Publication Data

US 2005/0106399 A1    May 19, 2005

(30) Foreign Application Priority Data

Mar. 7, 2002    (DE) ................. 102 10 026

(51) Int. Cl.
*C08K 5/5419*    (2006.01)
(52) U.S. Cl. .............. 524/268; 528/15; 528/31; 528/32
(58) Field of Classification Search ............. None
See application file for complete search history.

(56) References Cited

U.S. PATENT DOCUMENTS

| | | | |
|---|---|---|---|
| 3,775,452 A | 11/1973 | Karstedt | |
| 5,079,300 A | 1/1992 | Dubrow et al. | |
| 5,241,034 A | 8/1993 | Herzig et al. | |
| 5,548,038 A | 8/1996 | Enami et al. | |
| 5,691,435 A | 11/1997 | Herzig et al. | |
| 5,760,145 A | 6/1998 | Herzig et al. | |
| 5,994,454 A | 11/1999 | Chung et al. | |
| 6,034,225 A | 3/2000 | Weidner et al. | |
| 6,258,913 B1 | 7/2001 | Herzig et al. | |
| 6,265,497 B1 | 7/2001 | Herzig | |
| 6,274,692 B1 | 8/2001 | Herzig et al. | |
| 6,384,172 B1* | 5/2002 | Dvornic et al. | ............... 528/15 |

FOREIGN PATENT DOCUMENTS

| | | |
|---|---|---|
| DE | 195 22 144 A1 | 1/1997 |
| DE | 196 27 022 A1 | 1/1998 |
| DE | 196 29 053 A1 | 1/1998 |
| EP | 0 694 573 A2 | 1/1996 |
| EP | 0 716 115 A2 | 6/1996 |
| WO | WO 01/98418 A2 | 12/2001 |
| WO | WO 01/98420 A2 | 12/2001 |

OTHER PUBLICATIONS

English Derwent Abstract AN 1997-053209 (06) Corresp. to DE 195 22 144 A1.
English Derwent Abstract AN 1998-064258 (07) Corresp. to DE 196 27 022 A1.
English Derwent Abstract AN 1998-087924 (09) Corresp. to DE 196 29 053 A1.

* cited by examiner

*Primary Examiner*—Marc S. Zimmer
(74) *Attorney, Agent, or Firm*—Brooks Kushman P.C.

(57) ABSTRACT

Branched organosilicon compounds bearing aliphatic multiple bonds, prepared by reacting a branched organosilicon compound having Si-bonded hydrogen atoms with an organosiloxane or organopolysiloxane having terminal aliphatic multiple bonds and optionally equilibrating with further organopolysiloxanes are useful as antimisting additives in the high speed coating of substrates with crosslinkable silicone compositions.

13 Claims, No Drawings

BRANCHED ORGANOSILICON COMPOUNDS AS ANTIMISTING ADDITIVES FOR SILICONE COATING COMPOSITIONS

BACKGROUND OF THE INVENTION

1. Field of the Invention

The invention relates to the use of antimisting additives for reducing the formation of aerosol in crosslinkable silicone coating compositions.

2. Background Art

A trend within the silicone coating industry is to increase machine speed in order to raise productivity. Where silicone coatings are applied to the substrate at relatively high speeds, of more than 300 m/min, for example, fine spray mists of the silicone coating system may be formed. This aerosol is formed at the silicone applicator unit. The formation of this spray mist proves to be a serious problem in the context of further increases in the coating speed.

The formation of this spray mist can be reduced by adding what are known as antimisting additives to the silicone coating system.

EP-A 716 115 (Dow Corning Corp.) describes antimisting additives obtained by reacting an organosilicon compound, a compound containing oxyalkylene groups, and a catalyst.

The addition of these oxyalkylene-functional reaction products to crosslinkable silicone coating systems reduces the formation of aerosol in rapid coating processes.

The antimisting additives containing polyglycol groups, though, have the drawback of poor miscibility with the crosslinkable silicone coating compositions.

WO 01/98420 (Dow Corning Corp.) discloses a liquid silicone antimisting composition, which is obtained by reacting a) an organohydropolysiloxane having at least two Si—H groups (SiH) with b) an organoalkenylsiloxane having at least three alkenyl groups (C═C) in c) the presence of a platinum catalyst and if desired d) an inhibitor in a ratio of C═C/SiH≧4.6.

An extremely large excess of organoalkenylsiloxane (C═C) is necessary in order to prevent gelling. This excess influences the release properties of the base system, the crosslinkable silicone coating composition. Furthermore, an inhibitor has to be added to prevent gelling.

U.S. Pat. No. 5,760,145 (Wacker-Chemie GmbH) describes organopoly-siloxanes containing aliphatically unsaturated hydrocarbon radicals which are branched and whose organopolysiloxane blocks are linked by hydrocarbon bridges.

SUMMARY OF THE INVENTION

An object of the present invention was to provide antimisting additives for crosslinkable silicone coating compositions which reduce the formation of aerosol in rapid coating processes, which are readily miscible with the silicone coating compositions, and which do not impair the silicone coating compositions. These and other objects are achieved by the invention.

DETAILED DESCRIPTION OF THE PREFERRED EMBODIMENT(S)

The invention provides for the use of antimisting additives in crosslinkable silicone coating compositions for reducing the formation of aerosol, characterized in that as antimisting additives branched organosilicon compounds containing a) per molecule at least one unit of the general formula 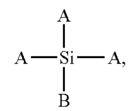 (I)

where A is a radical of the general formula $$—(OSiR^1R^2)_z—(OSiR_2)_x—Y—SiR_2O_{1/2}$$

R is identical or different at each occurrence and is a monovalent, aliphatically saturated or aromatic hydrocarbon radical having 1 to 12 carbon atoms per radical, $R^1$ is a radical of the general formula $$OSiR_2—Y—SiR_2O_{1/2},$$

$R^2$ has the definition of R, $R^1$ or R', R' being a monovalent, aliphatically saturated or aromatic hydrocarbon radical having 1 to 12 carbon atoms per radical, containing one or more heteroatoms selected from the group consisting of O, S, N, Si and Ti, Y is a divalent hydrocarbon radical of the general formula $$—CH_2CHR^5(—R^4)_v—,$$

$R^4$ is a divalent hydrocarbon radical having 1 to 10 hydrocarbon atoms per radical or is a chemical bond if v is 0, $R^5$ is a hydrogen atom or has the definition of R, v is 0 or 1, x is identical or different and is 0 or 1 and z is identical or different and is 0 or 1, and B has the definition of A or R or R' with the proviso that B is R or R' if x is 0, (b) per molecule at least one unit of the general formula $$O_{1/2}SiR_2R^3 \quad (II),$$

where R is as defined above and $R^3$ is an aliphatically unsaturated hydrocarbon radical of the general formula $$H_2C═CR^5(—R^4)_v—,$$

where $R^4$ and $R^5$ are as defined above, (c) optionally units of the general formula $$O_{1/2}SiR^3 \quad (III),$$

where R is as defined above, (d) optionally units of the general formula $$SiR_2O \quad (IV),$$

where R is as defined above, and (e) optionally units of the general formula $$O_{1/2}SiR_2—Y—SiR_2O_{1/2} \quad (V),$$

where R is as defined above, are used.

The invention further provides for the use of antimisting additives in crosslinkable silicone coating compositions for reducing the formation of aerosol, characterized in that antimisting additives used are branched organosilicon compounds preparable by in a first step subjecting compounds (1) of the general formula 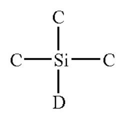 where C is a radical of the general formula $$—(OSiR^6R^7)_z(OSiR_2)_xH$$

where x and z are as defined above, $R^6$ is a radical of the general formula $$—OSiR_2H$$

and $R^7$ has the definition of R, R' or $R^6$, R and R' being as defined above, and D has the definition of C or R or R', with the proviso that D is R or R' if x is 0, and optionally compounds (2) of the general formula $$HR_2SiO(R_2SiO)_nSiR_2H$$

where R is as defined above and n is 0 or an integer from 1 to 100 to reaction with organo (poly)siloxanes (3) of the general formula $$R^3R_2SiO(R_2SiO)_mSiR_2R^3$$

where R and $R^3$ are as defined above and m is 0 or an integer from 1 to 1000 in the presence of catalysts (4) which promote the addition of aliphatic double bond onto Si-bonded hydrogen, and optionally in a second step equilibrating the resulting branched organosilicon compounds with organopolysiloxanes (5) selected from the group consisting of linear organopolysiloxanes containing terminal triorganosiloxy groups and linear organopolysiloxanes containing terminal hydroxyl groups.

The branched organosilicon compounds and their preparation are described in the above-cited U.S. Pat. Nos. 5,760,145, and 5,760,145 (incorporated by reference) is therefore part of the disclosure content of this specification.

The antimisting additives of the invention, the branched organosilicon compounds, have the advantage that they not only reduce the formation of aerosol by crosslinkable silicone coating compositions in rapid coating systems but also, in particular, can be mixed in any desired proportions, homogeneously, with the crosslinkable silicone coating compositions, unlike the antimisting additives containing polyglycol groups from the above-cited EP-A 716 115.

Moreover, the antimisting additives of the invention have no inhibiting effect and they are storage-stable.

The antimisting additives according to the invention have the advantage that they can be mixed beforehand with the polymer component (A) of the crosslinkable silicone coating composition. They are consequently easy to handle and do not impair the release properties of the base system, the crosslinkable silicone coating composition.

Included among the branched organosilicon compounds of the invention are both polymeric and oligomeric siloxanes.

The organosilicon compounds of the invention preferably include aliphatically unsaturated hydrocarbon radicals, more preferably on average per molecule at least two units of the formula (II), very preferably on average per molecule at least three units of the formula (II).

Preferably the organosilicon compounds of the invention contain a number of trifunctional (=T) and/or tetrafunctional (=Q) units of the formula (I) and also a number (=X) of units containing aliphatically unsaturated hydrocarbon radicals, of the formula (II), which are determined by the equations (i), (ii) and (iii)

(i) only units of the formula (I) with B=R or R', i.e., in the case of trifunctional units: $(T+1)<X<(T+2)$ (ii) only units of the formula (I) with B=A, i.e., in the case of tetrafunctional units: $(2Q+1)<X<(2Q+2)$ (iii) units with B=R or R' and B=A, i.e., in the case of trifunctional and tetrafunctional units: $(T+2Q+1)<X<(T+2Q+2)$ where T is a number from 0 to 10, Q is a number from 0 to 5 and the sum of T+Q is a number from 1 to 10.

The organosilicon compounds of the invention preferably possess a viscosity of from 200 to 2,000,000 $mm^2/s$ at 25° C., more preferably from 2000 to 1 000 000 $mm^2/s$ at 25° C.

The organosilicon compounds of the invention preferably have iodine numbers of between 0.2 and 20, preferably 1 and 10, the iodine number indicating the amount of iodine, in grams, consumed in the course of addition onto the double bond per 100 grams of inventive organosilicon compound employed.

Examples of the radical R are in each case alkyl radicals, such as the methyl, ethyl, n-propyl, isopropyl, n-butyl, isobutyl, tert-butyl, n-pentyl, isopentyl, neopentyl and the tert-pentyl radical, hexyl radicals, such as the n-hexyl radical, heptyl radicals, such as the n-heptyl radical, octyl radicals, such as the n-octyl radical and isooctyl radicals, such as the 2,2,4-trimethylpentyl and the 2-ethyl-hexyl radical, nonyl radicals, such as the n-nonyl radical, decyl radicals, such as the n-decyl radical, dodecyl radicals, such as the n-dodecyl radical, tetradecyl radicals, such as the n-tetradecyl radical, hexadecyl radicals, such as the n-hexadecyl radical and octadecyl radicals, such as the n-octadecyl radical, cycloalkyl radicals, such as cyclopentyl, cyclohexyl and 4-ethyl-cyclohexyl radical, cycloheptyl radicals, norbornyl radicals, and methylcyclohexyl radicals, aryl radicals, such as the phenyl, biphenyl, naphthyl and anthryl and phenanthryl radical, and alkaryl radicals, such as o-, m, p-tolyl radicals, xylyl radicals and ethylphenyl radicals and aralkyl radicals, such as the benzyl radical, and the α- and the β-phenylethyl radical.

The radical R is preferably the methyl radical.

Examples of radicals R' are the 2-methoxyethyl and the 2-ethoxyethyl radical, the 2-triethylsilylethyl radical, the 3-diethylaminopropyl radical and the 4,4-dimethyl-4-silaheptyl radical.

Examples of radicals Y are those of the formula $—CH_2CH_2—$, $—CH(CH_3)—$, $—(CH_2)_4—$, $—(CH_2)_5—$, $—(CH_2)_6—$, $—(CH_2)_8—$, $—(CH_2)_{10}—$, $—(CH_2)_{12}—$, preference being given to the radicals of the formula $—CH_2CH_2—$, $—CH(CH_3)$, $—(CH_2)_6—$-$(CH_2)_8—$, and particular preference to the radical of the formula $—CH_2CH_2—$.

Examples of radicals $R^3$ are the vinyl, allyl, 3-butenyl, 5-hexenyl, 7-octenyl, 9-decenyl and the 11-dodecenyl radical, preference being given to the vinyl and the 5-hexenyl radical and particular preference to the vinyl radical.

Preferably x is 1.

Preferably z is 0.

Preferably m is 0 or an integer from 1 to 40, more preferably 0 or an integer from 1 to 30.

Examples of compounds (1) are octylsilane, dodecylsilane, phenylsilane, methyltris(dimethylsiloxy)silane, methyltris(diethylsiloxy)silane, n-propyltris(dimethylsiloxy)silane, n-octyltris(dimethylsiloxy)silane, phenyltris(dimethylsiloxy)silane, tetrakis(dimethylsiloxy)silane, 1,3-dipropyl-1,1,3,3-tetrakis(dimethylsiloxy)disiloxane and 1,3-diphenyl-1,1,3,3-tetrakis(dimethylsiloxy)disiloxane, Examples of optionally co-used compounds (2) are 1,1,3,3-tetramethyldisiloxane, 1,1,3,3,5,5,9,9-octamethyltetrasiloxane, 1, 1, 3, 3, 5, 5, 9, 9, 11, 11, 13, 13, 15, 15-tetradecamethylheptasiloxane.

The amount of optionally used compound (2) in the process of the invention is sufficient that the Si-bonded hydrogen in compound (2) amounts to less than 75%, preferably less than 60%, of the total Si-bonded hydrogen employed.

Examples of organo(poly)siloxane (3) are 1,3-divinyl-1,1,3,3-tetramethyldisiloxane, copolymers comprising vinyldimethylsiloxane and dimethylsiloxane units, and copolymers comprising 5-hexenyldimethylsiloxane and dimethylsiloxane units.

In the process of the invention it is possible in the first step to use one kind of compound (1) or different kinds of compounds (1).

In the process of the invention it is possible in the first step to use one kind of organo(poly)siloxane (3) or different kinds of organo(poly)siloxane (3).

In the first step of the process of the invention the ratio of aliphatic double bond in the organo(poly)siloxane (3) to Si-bonded hydrogen in the compounds (1) and (2) is preferably from 1.3 to 5.0, more preferably from 1.5 to 3.0, very preferably from 1.6 to 2.5.

The process of the invention has the advantage that organosilicon compounds containing branched structures are obtained which have two or more aliphatically unsaturated hydrocarbon radicals exclusively at the chain ends. In contrast, usually in the case of polyaddition reactions, reacting linear organopolysiloxanes having two or more Si-bonded hydrogen atoms in the form of HRSiO units with linear organopolysiloxanes having several Si-bonded vinyl groups means that products having terminal and chain-internal vinyl groups are present, which are less reactive.

As catalysts (4) which promote the addition of Si-bonded hydrogen onto aliphatic multiple bond it is possible in the process of the invention as well to use the same catalysts which it has also been possible to date to use for promoting the addition of Si-bonded hydrogen onto aliphatic multiple bond. The catalysts (4) are preferably a metal from the group of the platinum metals or a compound or a complex from the group of the platinum metals. Examples of such catalysts are metallic and finely divided platinum, which may be on supports, such as silica, alumina or activated carbon, compounds or complexes of platinum, such as platinum halides, e.g., $PtCl_4$, $H_2PtCl_6 \cdot 6H_2O$, $Na_2PtCl_4 \cdot 4H_2O$, platinum-olefin complexes, platinum-alcohol complexes, platinum-alkoxide complexes, platinum-ether complexes, platinum-aldehyde complexes, platinum-ketone complexes, including reaction products of $H_2PtCl_6 \cdot 6H_2O$ and cyclohexanone, platinum-vinylsiloxane complexes, such as platinum-1,3-divinyl-1,1,3,3-tetramethyldisiloxane complexes with or without a detectable inorganically bonded halogen content, bis(gamma-picoline)platinum dichloride, trimethylenedipyridineplatinum dichloride, dicyclopentadieneplatinum dichloride, dimethyl-sulfoxide-ethyleneplatinum(II) dichloride, cyclooctadieneplatinum dichloride, norbornadieneplatinum dichloride, gamma-picolineplatinum dichloride, cyclopentadieneplatinum dichloride, and reaction products of platinum tetrachloride with olefin and primary amine or secondary amine or primary and secondary amine, such as the reaction product of platinum tetrachloride dissolved in 1-octene with sec-butylamine or ammonium-platinum complexes.

The catalyst (4) is used in the first process step preferably in amounts of from 0.1 to 50 ppm by weight (parts by weight per million parts by weight), more preferably in amounts of from 1 to 20 ppm by weight, calculated in each case as elemental platinum and based on the overall weight of the compounds (1) and (2) and organo(poly)siloxanes (3).

The first process step is preferably conducted at the pressure of the surrounding atmosphere, i.e., approximately at 1020 hPa (abs.), but may also be conducted at higher or lower pressures. Furthermore, the first process step is conducted preferably at a temperature of from 50° C. to 150° C., more preferably from 80° C. to 120° C.

In the first process step it is possible to use inert organic solvents, although the use of inert organic solvents is not preferred. Examples of inert organic solvents are toluene, xylene, octane isomers, butyl acetate, 1,2-dimethoxyethane, tetrahydrofuran, and cyclohexane.

Any inert organic solvents used are removed by distillation after the first process step.

Preferably the first step of the process is performed such that either components (1), optionally (2), (3) and (4) are mixed homogeneously at room temperature and then brought to reaction temperature, or components (3) and (4) together are introduced as an initial charge and, after they have been heated to reaction temperature, component (1) and optionally (2) is metered in.

In the first step of the process, referred to as hydrosilylation, it is not necessary for all of the Si-bonded hydrogen atoms to be reacted, but preferably a conversion of more than 95%, more preferably more than 99% of the Si-bonded hydrogen atoms is achieved.

It is not possible completely to avoid the organopolysiloxanes of the invention still containing residual amounts of organo(poly)siloxanes (3). Residual amounts of organo(poly)siloxanes (3) with m being 0 or an integer from 1 to 5 are preferably removed by distillation. Organo(poly)siloxanes (3) where m is greater than 5 cannot be removed by distillation, and remain in the product. The organopolysiloxanes obtained by the process of the invention may therefore contain organo(poly)siloxanes (3) in amounts of preferably from 0 to 60% by weight, more preferably from 0 to 40% by weight.

The branched organosilicon compounds obtained in the first step of the process can be equilibrated with organopolysiloxane (5) in a second step of the process.

In the course of the equilibration, the formation of rings without functional groups, which is known to the skilled worker and which are present in amounts of from 8 to 15% by weight, is unavoidable but not disruptive. If desired, the volatile fractions thereof (rings having 3–9 Si atoms) can be removed from the product mixture by distillation using reduced pressure and elevated temperatures. Like the rings, it is possible during the equilibration to contain other unwanted but nondisruptive secondary products in small amounts.

As organopolysiloxanes (5) it is preferred to use those selected from the group consisting of preferably linear organopolysiloxanes, containing terminal triorganosiloxy groups, of the formula $$R_3SiO(SiR_2O)_rSiR_3,$$

where R is as defined above and r is 0 or an integer of preferably from 1 to 1000, more preferably from 100 to 400, and linear organopolysiloxanes, containing terminal hydroxyl groups, of the formula $$HOR_2SiO(SiR_2O)_rSiR_2OH,$$

where R and r are as defined above.

The proportion of the organopolysiloxanes (5) used in the optional equilibration and branched organosilicon compounds is determined merely by the desired fraction of the alkenyl groups in the branched organosilicon compounds produced in the course of the optional equilibration, and by the desired average chain length.

In the course of the optional equilibration, it is preferred to use basic or acidic catalysts which promote the equilibration. Examples of such catalysts are preferably alkali metal hydroxides, such as sodium hydroxide, potassium hydroxide, and cesium hydroxide, trimethylbenzylammonium hydroxide, and tetramethylammonium hydroxide. Alkali metal hydroxides are preferred. Alkali metal hydroxides are used preferably in amounts of from 50 to 10 000 ppm by weight (=parts per million), in particular from 500 to 2000 ppm by weight, based in each case on the overall weight of the branched organosilicon compounds and organopolysiloxanes (5) used.

Examples of acidic catalysts are preferably sulfuric acid, phosphoric acid, trifluoromethanoic acid, phosphorus nitride chlorides, and acidic catalysts which are solid under the reaction conditions, such as acid-activated bleaching earth, acidic zeolites, sulfonated charcoal, and sulfonated styrene-divinylbenzene copolymer. Phosphorus nitride chlorides are preferred. Phosphorus nitride chlorides are used preferably in amounts of from 5 to 1000 ppm by weight (=parts per million), in particular from 50 to 200 ppm by weight, based in each case on the overall weight of the branched organosilicon compounds and organopolysiloxanes (5) used.

The optional equilibration is conducted preferably at from 100° C. to 150° C. and under the pressure of the surrounding atmosphere, i.e., approximately at 1020 hPa (abs.). If desired, however, it is also possible to employ higher or lower pressures. The equilibration is preferably conducted in from 5 to 20% by weight, based on the overall weight of the respective branched organosilicon compounds and organopolysiloxanes (5) used, in water-immiscible solvent, such as toluene. The catalyst can be deactivated before the equilibration mixture is worked up.

The process of the invention can be conducted batchwise, semicontinuously or fully continuously.

As antimisting additives it is preferred to use those branched organosilicon compounds which are prepared without a further equilibration step and have a particularly high level of branching. Preferred additives are obtained from operating in the particularly preferred stoichiometric ranges indicated.

For reducing the formation of aerosol the antimisting additives of the invention are added to the crosslinkable silicone coating compositions.

The antimisting additives of the invention, the alkenyl-functional siloxane copolymers, are used in the crosslinkable silicone coating compositions preferably in amounts of from 0.5 to 10% by weight, more preferably from 1 to 5% by weight, based on the overall weight of the crosslinkable silicone coating compositions.

As crosslinkable silicone coating compositions it is preferred to use those comprising
(A) organosilicon compounds having radicals containing aliphatic carbon—carbon multiple bonds,
(B) organosilicon compounds containing Si-bonded hydrogen atoms,
(C) catalysts which promote the addition of Si-bonded hydrogen onto aliphatic multiple bond, and if desired
(D) inhibitors.

The invention further provides crosslinkable silicone coating compositions featuring reduced aerosol formation, comprising
(X) antimisting additives of the invention,
(A) organosilicon compounds having radicals containing aliphatic carbon—carbon multiple bonds,
(B) organosilicon compounds containing Si-bonded hydrogen atoms,
(C) catalysts which promote the addition of Si-bonded hydrogen onto aliphatic multiple bond, and if desired
(D) inhibitors.

For the crosslinkable silicone coating compositions it is possible with preference to use one kind of the antimisting additive (X) of the invention or different kinds of the antimisting additive (X) of the invention.

As organopolysiloxanes (A) having radicals containing aliphatic carbon—carbon multiple bonds it is preferred to use linear or branched organopolysiloxanes comprising units of the general formula $$R^5_z R^6_y SiO_{\frac{4-z-y}{2}}, \qquad (VI)$$

where $R^5$ is a monovalent, unsubstituted or substituted, hydrocarbon radical having from 1 to 18 carbon atoms per radical and being free from aliphatic carbon—carbon multiple bonds and
$R^6$ is a monovalent hydrocarbon radical having from 2 to 8 carbon atoms per radical and containing a terminal aliphatic carbon—carbon multiple bond,
z is 0, 1, 2 or 3,
y is 0, 1 or 2
and the sum z+y is 0, 1, 2 or 3,
with the proviso that there are on average at least 1.5 radicals $R^6$, preferably on average at least 2 radicals $R^6$.

Preferred organosilicon compounds (A) are organopolysiloxanes of the general formula $$R^6_g R^5_{3-g}SiO(SiR^5_2O)_v(SiR^5R^6O)_wSiR^5_{3-g}R^6_g \qquad (VII)$$

where $R^5$ and $R^6$ are as defined above,
g is 0, 1 or 2,
v is 0 or an integer from 1 to 1500, and
w is 0 or an integer from 1 to 200,
with the proviso that on average at least 1.5 radicals $R^6$, preferably on average at least 2 radicals $R^6$, are present.

In the context of this invention formula (VII) is to be understood to mean that v units —(SiR$^5_2$O)— and w units —(SiR$^5$R$^6$O)— may be distributed arbitrarily in the organopolysiloxane molecule.

As organosilicon compounds (A) it is also possible to use branched polymers containing terminal ω-alkenyl groups, preferably Si-bonded vinyl groups, as described in U.S. Pat. No. 6,034,225 (incorporated by reference), especially column 1 line 43 to column 2 line 13, and U.S. Pat. No. 6,258,913 (incorporated by reference), especially column 1 line 62 to column 2 line 35.

As organosilicon compounds (A) it is also possible to use linear organopolysiloxanes as described in U.S. Pat. No. 6,274,692 (incorporated by reference), especially column 2 lines 3 to 27, which do not have an aliphatically unsaturated hydrocarbon radical, such as an Si-bonded vinyl group, at both ends but instead also have aliphatically saturated hydrocarbon radicals, such as Si-bonded methyl groups, at the ends.

As organosilicon compounds (A) it is also possible to use those as described in U.S. Pat. No. 5,241,034 (incorporated by reference), especially column 16, line 23 to column 17, line 35, DE-A 195 22 144 (incorporated by reference), especially page 2 lines 44 to 67, DE-A 196 29 053 (incorporated by reference), especially page 2 line 51 to page 3 line 29, and U.S. Pat. No. 6,265,497 (incorporated by reference), especially column 2 lines 3 to 47.

The organopolysiloxanes (A) preferably possess an average viscosity of from 100 to 10,000 mPa·s at 25° C.

Examples of hydrocarbon radicals $R^5$ are alkyl radicals, such as the methyl, ethyl, n-propyl, isopropyl, n-butyl, isobutyl, tert-butyl, n-pentyl, isopentyl, neopentyl, tert-pentyl radical, hexyl radicals, such as the n-hexyl radical, heptyl radicals, such as the n-heptyl radical, octyl radicals, such as the n-octyl radical and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical; cycloalkyl radicals, such as cyclopentyl, cyclohexyl, cycloheptyl radicals and methylcyclohexyl radicals, aryl radicals, such as the phenyl, naphthyl, anthryl and phenanthryl radical; alkaryl radicals, such as o-, m-, p-tolyl radicals, xylyl radicals and ethylphenyl radicals, and aralkyl radicals, such as the benzyl radical, the α- and the β-phenylethyl radical.

Examples of radicals $R^6$ are alkenyl radicals, such as the vinyl, 5-hexenyl, allyl, 3-butenyl and 4-pentenyl radical; and alkynyl radicals, such as the ethynyl, propargyl and 1-propyne radical.

As organosilicon compounds (B) which contain Si-bonded hydrogen atoms it is preferred to use linear, cyclic or branched organopolysiloxanes comprising units of the general formula $$R^5_e H_f SiO_{\frac{4-e-f}{2}}, \qquad (VIII)$$

where
$R^5$ is as defined above,
e is 0, 1, 2 or 3,
f is 0, 1 or 2
and the sum of e+f is 0, 1, 2 or 3,
with the proviso that there are on average at least two Si-bonded hydrogen atoms.

The organosilicon compounds (B) preferably contain at least three Si-bonded hydrogen atoms.

As organosilicon compounds (B) it is more preferred to use organopolysiloxanes of the general formula $$H_h R^5_{3-h} SiO(SiR^5_2 O)_o (SiR^5 HO)_p SiR^5_{3-h} H_h \qquad (IX)$$

where $R^5$ is as defined above,
h is 0, 1 or 2,
o is 0 or an integer from 1 to 1500, and
p is 0 or an integer from 1 to 200,
with the proviso that there are on average at least 2 Si-bonded hydrogen atoms.

In the context of this invention formula (IX) is to be understood to mean that o units —(SiR$^5_2$O)— and p units —(SiR$^5$HO)— may be distributed arbitrarily in the organopolysiloxane molecule.

Examples of such organopolysiloxanes are, in particular, copolymers comprising dimethylhydrosiloxane, methylhydrosiloxane, dimethylsiloxane and trimethylsiloxane units, copolymers comprising trimethylsiloxane, dimethylhydrosiloxane and methylhydrosiloxane units, copolymers comprising trimethylsiloxane, dimethylsiloxane and methylhydrosiloxane units, copolymers comprising methylhydrosiloxane and trimethylsiloxane units, copolymers comprising methylhydrosiloxane, diphenylsiloxane and trimethylsiloxane units, copolymers comprising methylhydrosiloxane, dimethylhydrosiloxane and diphenylsiloxane units, copolymers comprising methylhydrosiloxane, phenylmethylsiloxane, trimethylsiloxane and/or dimethylhydrosiloxane units, copolymers comprising methylhydrosiloxane, dimethylsiloxane, diphenylsiloxane, trimethylsiloxane and/or dimethylhydrosiloxane units, and copolymers comprising dimethylhydrosiloxane, trimethylsiloxane, phenylhydrosiloxane, dimethylsiloxane and/or phenylmethylsiloxane units.

As organosilicon compounds (B) it is also possible to use those as described in U.S. Pat. No. 5,691,435 (incorporated by reference), especially column 3 line 45 to column 4 line 29.

The organopolysiloxanes (B) preferably possess an average viscosity of from 10 to 1,000 mPa·s at 25° C.

Organosilicon compound (B) is used preferably in amounts of from 0.5 to 3.5, more preferably from 1.0 to 3.0, gram atoms of Si-bonded hydrogen per mole of Si-bonded radical containing aliphatic carbon—carbon multiple bond in the organosilicon compound (A).

In the case of the crosslinkable silicone coating compositions as well it is possible, as catalysts which promote the addition of Si-bonded hydrogen onto aliphatic multiple bonds, to use the same catalysts which it has also been possible to use to date to promote the addition of Si-bonded hydrogen onto aliphatic multiple bond. As constituent (C) it is preferred to use the above-mentioned catalysts (3).

The catalysts (C) are used preferably in amounts of from 10 to 1000 ppm by weight (parts by weight per million parts by weight), more preferably from 50 to 200 ppm by weight, calculated in each case as elemental platinum metal and based on the overall weight of the organosilicon compounds (A) and (B).

The crosslinkable silicone coating compositions may comprise agents which retard the addition of Si-bonded hydrogen onto aliphatic multiple bond at room temperature, known as inhibitors (D).

For the crosslinkable silicone coating compositions as well it is possible as inhibitors (D) to use all inhibitors which it has also been possible to use to date for the same purpose.

Examples of inhibitors (D) are 1,3-divinyl-1,1,3,3-tetramethyldisiloxane, benzotriazole, dialkylformamides, alkylthioureas, methyl ethyl ketoxime, organic compounds or organosilicon compounds having a boiling point of at least 25° C. at 1012 mbar (abs.) and containing at least one aliphatic triple bond, such as 1-ethynylcyclohexan-1-ol, 2-methyl-3-butyn-2-ol, 3-methyl-1-pentyn-3-ol, 2,5-dimethyl-3-hexyne-2,5-diol and 3,5-dimethyl-1-hexyn-3-ol, 3,7-dimethyloct-1-yn-6-en-3-ol, a mixture of diallyl maleate and vinyl acetate, maleic monoesters, and inhibitors such as the compound of the formula HC≡C—C(CH$_3$)(OH)—CH$_2$—CH$_2$—CH=C(CH$_3$)$_2$, available commercially under the trade name "Dehydrolinalool" from BASF.

Where inhibitor (D) is used, it is employed appropriately in amounts of preferably from 0.01 to 10% by weight, more preferably from 0.01 to 3% by weight, based on the overall weight of the organosilicon compounds (A) and (B).

Examples of further constituents which may be used in the crosslinkable silicone coating compositions are agents for adjusting the release force, organic solvents, adhesion promoters, and pigments.

Examples of agents for adjusting the release force of the coatings, repellent to tacky substances, that are produced with the compositions of the invention are silicone resins comprising units of the formula

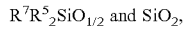
$R^7R^5{}_2SiO_{1/2}$ and $SiO_2$, known as MQ resins, where $R^7$ is a hydrogen atom, a hydrocarbon radical $R^5$, such as methyl radical, an alkenyl radical $R^6$, such as vinyl radical, and $R^5$ and $R^6$ are as defined above, and the units of the formula $R^7R^5{}_2SiO_{1/2}$ may be identical or different. The ratio of units of the formula $R^7R^5{}_2SiO_{1/2}$ to units of the formula $SiO_2$ is preferably from 0.6 to 2. The silicone resins are used preferably in amounts of from 5 to 80% by weight, based on the overall weight of the organosilicon compounds (A) and (B).

Examples of organic solvents are petroleum spirits, e.g., mixtures of alkanes having a boiling range of from 70° C. to 180° C., n-heptane, benzene, toluene and xylenes, halogenated alkanes having from 1 to 6 carbon atoms, such as methylene chloride, trichloroethylene and perchloro-ethylene, ethers, such as di-n-butyl ether, esters, such as ethyl acetate, and ketones, such as methyl ethyl ketone and cyclohexanone.

Where organic solvents are used, they are employed appropriately in amounts of preferably from 10 to 90% by weight, more preferably from 10 to 70% by weight, based on the overall weight of the organosilicon compounds (A) and (B).

Although the sequence when mixing the constituents (X), (A), (B), (C) and, where used, (D) is not critical, it has nevertheless been found appropriate for practical purposes to add constituent (C), viz the catalyst, last to the mixture of the other constituents.

The crosslinking of the compositions of the invention takes place preferably at from 70° C. to 180° C. As energy sources for thermal crosslinking it is preferred to use ovens, e.g., forced air drying ovens, heating tunnels, heated rollers, heated plates, or heat rays from the infrared region.

As well as thermally, the compositions of the invention may also be crosslinked by irradiation with ultraviolet light or by irradiation with UV and IR light. As ultraviolet light it is common to use that having a wavelength of 253.7 nm. In commerce there are a large number of lamps which emit ultraviolet light having a wavelength of from 200 to 400 nm and which preferentially emit ultraviolet light having a wavelength of 253.7 nm.

The invention further provides shaped bodies produced by crosslinking the compositions of the invention.

The shaped bodies preferably comprise coatings, more preferably coatings which repel tacky substances.

The invention further provides a process for producing coatings by applying crosslinkable compositions of the invention to the surfaces that are to be coated and then crosslinking the compositions.

The crosslinkable compositions of the invention are used preferably for producing coatings which repel tacky substances, e.g., for producing release papers. Coatings which repel tacky substances are produced by applying crosslinkable compositions of the invention to the surfaces that are to be made repellent to tacky substances and then crosslinking the compositions.

The application of the compositions of the invention to the surfaces to be coated, preferably surfaces to be made repellent to tacky substances, may be accomplished in any desired manner which is suitable and widely known for the production of coatings from liquid materials; for example, by dipping, brushing, pouring, spraying, rolling, printing, by means of an offset gravure coating apparatus, for example, blade or knife coating, or by means of an airbrush.

The coat thickness on the coated surfaces is preferably from 0.3 to 6 μm, with particular preference from 0.5 to 2.0 μm.

The surfaces to be coated, preferably surfaces to be made repellent to tacky substances, which may be treated in the context of the invention may be surfaces of any materials which are solid at room temperature and 1012 mbar (abs.). Examples of surfaces of this kind are those of paper, wood, cork, and polymer films, e.g., polyethylene films or polypropylene films, woven and nonwoven fabric of natural or synthetic fibers, ceramic articles, glass, including glass fibers, metals, polyethylene-coated paper, and boards, including those of asbestos. The abovementioned polyethylene may in each case be high-pressure, medium-pressure or low-pressure polyethylene. In the case of paper the paper in question may be of a low-grade kind, such as absorbent papers, including kraft paper which is in the raw state, i.e., has not been pretreated with chemicals and/or natural polymeric substances, and which has a weight of from 60 to 150 g/m$^2$, unsized papers, papers of low freeness value, mechanical papers, unglazed or uncalendered papers, papers which are smooth on one side owing to the use of a dry glazing cylinder during their production, without additional complex measures, and which are therefore referred to as "machine-glazed papers", uncoated papers or papers produced from waste paper, i.e., what are known as recycled papers. The paper to be treated in accordance with the invention may also of course, however, comprise high-grade paper types, such as low-absorbency papers, sized papers, papers of high freeness value, chemical papers, calendered or glazed papers, glassine papers, parchmentized papers or precoated papers. The boards as well may be of high or low grade.

The compositions of the invention are suitable, for example, for producing release, backing, and interleaving papers, including interleaving papers which are employed in the production of, for example, cast films or decorative films, or of foam materials, including those of polyurethane. The compositions of the invention are also suitable, for example, for producing release, backing, and interleaving cards, films, and cloths, for treating the reverse sides of self-adhesive tapes or self-adhesive sheets or the written faces of self-adhesive labels. The compositions of the invention are additionally suitable for treating packing material, such as that comprising paper, cardboard boxes, metal foils and drums, e.g., cardboard, plastic, wood or iron, which is intended for storing and/or transporting tacky goods, such as adhesives, sticky foodstuffs, e.g., cakes, honey, candies, and meat; bitumen, asphalt, greased materials, and crude rubber. A further example of the application of the compositions of the invention is the treatment of carriers for transferring pressure-sensitive adhesive films in the context of what is known as the transfer process.

The crosslinkable silicone coating compositions comprising the antimisting additives of the invention are especially suitable for use in rapid coating systems with coating speeds of preferably from 300 to 2000 m/min, more preferably from 400 to 1500 m/min, in which the compositions of the invention are applied at high speeds to the surfaces that are to be coated.

The compositions of the invention are suitable for producing the self-adhesive materials joined to the release paper, both by the offline method and by the inline method.

In the offline method, the silicone composition is applied to the paper and crosslinked, and then, in a subsequent stage, normally after the winding of the release paper onto a roll and after the storage of the roll, an adhesive film, present for example on a label face paper, is applied to the coated paper and the composite is then compressed. In the inline method the silicone composition is applied to the paper and crosslinked, the silicone coating is coated with the adhesive, the label face paper is then applied to the adhesive, and the composite, finally, is compressed.

In the case of the offline method the winding speed is governed by the time needed to render the silicone coating tack-free. In the case of the inline method the process speed is governed by the time needed to render the silicone coating migration-free. With the compositions of the invention the offline method and the inline method can be operated at speeds from 300 to 2000 m/min, preferably from 400 to 1500 m/min.

1. Preparation of the Branched Organosilicon Compounds:

EXAMPLE 1

2.00 g of tris(dimethylsiloxy)phenylsilane are mixed homogeneously in each case with precisely 132 times the amount of α,ω-divinylpolydimethylsiloxane of iodine number 3.14 and toluene (C=C/SiH=1.8). Then at 25° C. a 1% strength by weight (based on elemental platinum) solution of a platinum-1,3-divinyl-1,1,3,3-tetramethyldisiloxane complex in an α,ω-divinyldimethylpolysiloxane having a viscosity of 1000 mPa·s at 25° C. (a solution of a catalyst known as the Karstedt catalyst, whose preparation is described in U.S. Pat. No. 3,775,452) is added in an amount such that the reaction mixture contains 5 ppm platinum. Thereafter the batch is heated at 80° C. for 1 h. The toluene is removed from the reaction mixture under reduced pressure and replaced by the same amount of 1-dodecene. The resulting polymer solution in α-olefin has a viscosity of 2860 mm$^2$ (25° C.).

EXAMPLE 2

2.00 g of tris(dimethylsiloxy)phenylsilane are mixed homogeneously in each case with precisely 100 times the amount of α,ω-divinylpolydimethylsiloxane of iodine number 4.1 and toluene (C=C/SiH=1.8). Then at 25° C. the Karstedt catalyst solution described in example 1 is added in an amount such that the reaction mixture contains 5 ppm platinum. Thereafter the batch is heated at 80° C. for 1 h. The toluene is removed from the reaction mixture under reduced pressure and replaced by the same amount of 1-dodecene. The resulting polymer solution in α-olefin has a viscosity of 2670 mm$^2$/s (25° C.).

EXAMPLE 3

2.00 g of tris(dimethylsiloxy)phenylsilane are mixed homogeneously in each case with precisely 100 times the amount of α,ω-divinylpolydimethylsiloxane of iodine number 4.1 and trimethylsilyl-terminated polydimethylsiloxane of viscosity 9.8 m$^2$/s (25° C.) (C=C/SiH=1.8). Then at 25° C. the Karstedt catalyst solution described in example 1 is added in an amount such that the reaction mixture contains 5 ppm platinum. Thereafter the batch is heated at 80° C. for 1 h and attains thereafter a viscosity of 9200 mm$^2$/s (25° C.). The solution of the vinyl-functional branched silicone polymer in trimethylsilyl-terminated polydimethylsiloxane is clear and can be mixed as desired with polydimethylsiloxane.

EXAMPLE 4

2.00 g of tris(dimethylsiloxy)phenylsilane are mixed homogeneously in each case with precisely 132 times the amount of α,ω-divinylpolydimethylsiloxane of iodine number 3.14 and trimethylsilyl-terminated polydimethylsiloxane of viscosity 9.8 m$^2$/s (25° C.) (C=C/SiH=1.8). Then at 25° C. the Karstedt catalyst solution described in example 1 is added in an amount such that the reaction mixture contains 5 ppm platinum. Thereafter the batch is heated at 80° C. for 1 h and attains thereafter a viscosity of 17 800 mm$^2$/s (25° C.). The solution of the vinyl-functional branched silicone polymer in trimethylsilyl-terminated polydimethylsiloxane is clear and can be mixed as desired with polydimethylsiloxane.

EXAMPLE 5

2.00 g of tris(dimethylsiloxy)phenylsilane are mixed homogeneously in each case with precisely 100 times the amount of α,ω-divinylpolydimethylsiloxane of iodine number 4.1 and toluene (C=C/SiH=1.8). Then at 25° C. the Karstedt catalyst solution described in Example 1 is added in an amount such that the reaction mixture contains 5 ppm platinum. Thereafter the batch is heated at 80° C. for 1 h.

The toluene is removed from the reaction mixture under reduced pressure and replaced by three times the amount of a α,ω-divinylpolydimethylsiloxane having a viscosity of 200 mm$^2$/s (25° C.). The resulting mixture of the branched vinyl-functional polymer α,ω-divinylpolydimethylsiloxane has a viscosity of 1600 mm$^2$/s (25° C.).

2. Use of the Branched Organosilicon Compounds as Antimisting Additives

EXAMPLE 6

The branched organosilicon compounds of the invention are used, for reducing the formation of aerosol, as additives in crosslinkable silicone coating systems for use in rapid coating processes.

The standard formulation used was a mixture of 100 parts by weight of a linear α,ω-divinyldimethylpolysiloxane, having a viscosity of 300 mPa·s (25° C.), 3.1 parts by weight of a linear polysiloxane comprising hydromethylsiloxane and dimethylsiloxane units in a molar ratio of 2:1 having trimethylsiloxane end units and a viscosity of 34 mPa·s (25° C.), 1.25 parts by weight of a 1% strength by weight (based on elemental platinum) solution of a platinum-1,3-divinyl-1,1,3,3-tetramethyldisiloxane complex in an α,ω-divinyldimethylpolysiloxane having a viscosity of 1000 mPa·s at 25° C., and 0.3 part by weight of 1-ethynylcyclohexanol.

assessed according to its extent using the marks 1 to 6, mark 1 meaning no abrasion, mark 3 slight and mark 6 severe abrasion.

The test methods are described in the brochure DEHE-SIVE® Silicones Test Methods from Wacker-Chemie GmbH. The results are summarized in table 1.

TABLE 1

| Additive | Amount [%] | Misting [mg/m$^3$] min. | max. | av. | Average misting [mg/m$^3$] standardized to 1.0 g/m$^2$ | Migration | Abrasion | Extract [%] in MIBK |
|---|---|---|---|---|---|---|---|---|
| Ex. 1 | 4 | 0.059 | 0.103 | 0.086 | 0.06 | 1 | 2 | 4.0 |
| Ex. 2 | 4 | 0.041 | 0.063 | 0.055 | 0.04 | 1 | 1 | 4.5 |
| Ex. 5 | 8 | 0.048 | 0.083 | 0.067 | 0.04 | 1 | 1 | 6.4 |
| Ex. 5 | 4 | 0.057 | 0.189 | 0.134 | 0.09 | 1 | 2 | 4.5 |
| Ex. 5 | 2 | 0.136 | 0.256 | 0.180 | 0.13 | 1 | 1 | 4.3 |
| — | — | 19.47 | 30.17 | 24.27 | 16.51 | 1 | 2 | 3.9 |

The additives of the invention from the preparation examples indicated in table 1 were added to the standard formulation in the amounts specified in table 1. As a control, a standard formulation without inventive additive was used. These mixtures were used for coating paper.

The substrate used was paper from Ahlstrom bearing the designation Glassine Larice Tipo 325, 62 g/m$^2$. Coating was carried out on the "BMB Pilotplant" coating unit from Bachofen & Meier A G, having a 5-roll applicator unit, at 550 m/min. The application roller was run at 95% of the paper speed. The coating was cured in a drying oven with a length of 18 m at 160° C. This corresponds to a crosslinking time of 1.96 seconds.

The formation of aerosol was determined using the Dust-trak Aerosol Monitor Model 8520. Samples were taken between the silicone application roll and the roll nip at a distance of 12 cm from the silicone application roll. The blank aerosol value prior to the coating tests was between 0.028-0.031 mg/m$^3$. During the coating tests, the minimum and maximum indicated aerosol levels were recorded and the average was calculated. The average aerosol levels measured during the coating tests were corrected by the blank value of 0.03 mg/m$^3$ in order to determine the effect due purely to the antimisting additives of the invention.

The coating weight was determined by means of x-ray fluorescence analysis in reference to an appropriate standard.

Since the extent of aerosol formation is dependent among other things on the coating weight, the average calculated aerosol levels were standardized to a coating weight of 1 g/m$^2$ for the purpose of better comparability.

The effect of the antimisting additives of the invention on the curing of the coating system was determined immediately by means of a migration test and in parallel by means of extraction of uncrosslinked fractions in MIBK (methyl isobutyl ketone).

The migration is assessed according to its extent using the marks 1 to 6, mark 1 meaning no migration (complete curing), mark 3 slight and mark 6 severe migration (incomplete curing).

The effect of the antimisting additives of the invention on the adhesion of the coating system to the substrate was determined by means of a ruboff test. The abrasion is The examples in comparison with the control test without additive show that the addition of the antimisting additives of the invention significantly reduces the formation of aerosol by crosslinkable silicone coating systems in rapid coating processes.

Deleterious effects on migration and substrate adhesion (abrasion) are not observed; within the bounds of measurement accuracy, the proportion of the extractable fractions is not increased.

EXAMPLE 7

At a high application weight and with certain coating formulations, aerosol may be formed even at machine speeds well below 500 m/min. The branched organosilicon compounds of the invention were used, for reducing the formation of aerosol, as additives in crosslinkable silicone coating systems for use in such coating processes.

The standard formulation used was a mixture of 100 parts by weight of a branched polysiloxane containing vinyldimethylsiloxy end groups, having a viscosity of 420 mPa·s (25° C.) and an iodine number of 8.0, prepared in accordance with Example 3 of U.S. Pat. No. 6,034,225, 3.6 parts by weight of a linear polysiloxane comprising hydromethylsiloxane and trimethylsiloxane units in a molar ratio of 24:1, 1.04 parts by weight of a 1% strength by weight (based on elemental platinum) solution of a platinum-1,3-divinyl-1,1, 3,3-tetramethyldisiloxane complex in an α,ω-divinyldimethylpolysiloxane having a viscosity of 1000 mPa·s at 25° C., and 0.3 part by weight of 1-ethynylcyclohexanol.

The additives of the invention from the preparation examples indicated in table 2 were added to the standard formulation in the amounts specified in table 2. As a control, a standard formulation without inventive additive was used. These mixtures were used for coating paper.

The substrate used was paper from Ahlstrom bearing the designation Glassine Larice Tipo 325, 62 g/m$^2$. Coating was carried out on the pilot coating unit from Dixon with the model number 1060, having a 5-roll applicator unit, at 150 m/min. The application roller was run at 95% of the paper speed. The coating was cured in a drying oven with a length of 3 m at 140° C.

The formation of aerosol was determined using the Dust-trak Aerosol Monitor Model 8520. Samples were taken between the silicone application roll and the roll nip at a distance of 12 cm from the silicone application roll. Additionally, the formation of aerosol was assessed visually and evaluated with the codes 1–3:
  1 no visible aerosol formation
  2 slightly visible aerosol formation
  3 severe aerosol formation.

During the coating experiments, the maximum indicated aerosol levels were recorded. The coating weight was determined by means of X-ray fluorescence analysis in reference to an appropriate standard, and was 4 g/m².

Furthermore, the effect of the antimisting additives according to the invention on the curing of the coating system was determined by means of a migration test. The migration test is described in the brochure DEHESIVE® Silicones Test Methods from Wacker-Chemie GmbH.

The results are summarized in table 2.

TABLE 2

| Additive | Amount of additive in % | Misting, mg/m³ (Dusttrak) | Misting (visual) | Migration |
|---|---|---|---|---|
| Example 5 | 8 | 2 | 1 | 2 |
| Example 3 | 4 | 1 | 1 | 1.5 |
| Example 4 | 0.8 | 1 | 1.5 | 1.5 |
| Example 1 | 4 | 1 | 1 | 1.5 |
| Example 2 | 4 | 0.8 | 1 | 1 |
| — | — | 17 | 3 | 2 |

The comparative experiments show that the addition of the branched organosilicon compound of the invention, as antimisting additives markedly reduces the formation of aerosol by crosslinkable silicone coating systems in rapid coating processes.

Example 8 and comparative test as per EP-A 716 115:

An important criterion for the simple usefulness of antimisting additives in curable compositions is their miscibility with these compositions.

In order to obtain reproducible results when curing on the coating machine, it is advantageous if the additive can be dispersed homogeneously in the desired amount in the curable composition without unduly great effort, and forms a clear formulation. Accordingly, 104.4 g of the standard formulation from Example 6 are mixed with 10 g of each of the additives from preparation examples 1 to 5 by moderate stirring using a glass rod, so that a ready-to-use formulation is formed within a few minutes. All formulations are homogeneous, clear, and free from streaks.

For comparison, in accordance with the state of the art, an antimisting additive as per EP-A 716 115 is prepared:

A mixture of 34 g of 2-methyl-3-buten-2-ol and 190 g of an allyl polyether of the formula $CH_2=CH-CH_2O(C_2H_4O)_{9.4}H$ is mixed with 200 g of a siloxane having trimethylsiloxy end groups and comprising hydromethylsiloxane and dimethylsiloxane units (0.30% by weight active hydrogen, viscosity 37 mm²/s at 25° C.), and the mixture is heated to 50° C. and activated with 20 ppm platinum in the form of the platinum catalyst described in Example 8 (Karstedt catalyst). After 2 hours, the exothermic reaction gives a clear product with an active hydrogen content of less than 0.002% by weight and a slight brown coloration. Stirring 10 g of this product into 104.4 g of the standard formulation from Example 6 gives a milky mixture which shows severe phase separation after 4 hours of storage. Even when only 5 g of this additive is mixed in under strong shearing with a Turrax® device, a clear formulation is not obtained.

The invention claimed is:

1. A process for reducing formation of aerosol during coating of substrates with a crosslinkable silicone composition, comprising adding to said composition at least one antimisting additive which is a branched organosilicon compound comprising
  a) per molecule at least one unit of the formula

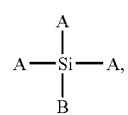
(I)

where A is a radical of the formula $-(OSiR^1R^2)_z-(OSiR_2)_x-Y-SiR_2O_{1/2}$,

R each independently is a monovalent, aliphatically saturated hydrocarbon radical having 1 to 12 carbon atoms per radical or an aromatic hydrocarbon radical having 6 to 12 carbon atoms per radical,
  $R^1$ is a radical of the formula $OSiR_2-Y-SiR_2O_{1/2}$, $R^2$ has the definition of R, $R^1$ or R', where R' is a monovalent, aliphatically saturated hydrocarbon radical having from 1 to 12 carbon atoms per radical or an aromatic hydrocarbon radical having 6 to 12 carbon atoms per radical, and contains one or more nonadjacent heteroatoms selected from the group consisting of O, S, N, Si and Ti,
  Y is a divalent hydrocarbon radical of the formula $-CH_2CHR^5(-R^4)_v-$, $R^4$ is a divalent hydrocarbon radical having 1 to 10 carbon atoms per radical or is a chemical bond if v is 0,
  $R^5$ is a hydrogen atom or has the definition of R,
  v is 0 or 1,
  x each independently 0 or 1, and
  z each independently 0 or 1,
  and B has the definition of A, R, or R' with the proviso that B is R or R' if x is 0,
  (b) per molecule at least one unit of the formula $O_{1/2}SiR_2R^3$ (II), where
  $R^3$ is an aliphatically unsaturated hydrocarbon radical of the formula $H_2C=CR^5(-R^4)_v-$, (c) optionally units of the formula $O_{1/2}SiR_3$ (III), (d) optionally units of the formula $SiR_2O$ (IV), and
  (e) optionally units of formula $O_{1/2}SiR_2-Y-SiR_2O_{1/2}$ (V), where R is as defined above.

2. The process of claim 1, wherein the radical $R^3$ is a vinyl radical.

3. The process of claim 1, wherein Y is a group of the formula $-CH_2CH_2-$.

4. The process of claim 1, wherein x is 1 and z is 0.

5. A process for reducing formation of aerosol during coating of substrates with a crosslinkable silicone composition, comprising adding to said composition at least one antimisting additive which is a branched organosilicon compound prepared by;

in a first step,
reacting compounds (1) of the formula $$\begin{array}{c} C \\ | \\ C-Si-C \\ | \\ D \end{array}$$

where C is a radical of the formula

—(OSiR$^6$R$^7$)$_z$(OSiR$_2$)$_x$H where
x each independently is 0 or 1, and
z each independently is 0 or 1,
R$^6$ is a radical of the formula —OSiR$_2$H and R$^7$ has the definition of R, R' or R$^6$,
R each independently is an aliphatically saturated hydrocarbon radical having 1 to 12 carbon atoms per radical or an aromatic hydrocarbon radical having 6 to 12 carbon atoms per radical,
R' each independently is a monovalent, aliphatically saturated hydrocarbon radical having from 1 to 12 carbon atoms or an aromatic hydrocarbon radical having from 6 to 12 carbon atoms and contains one or more nonadjacent heteroatoms selected from the group consisting of O, S, N, Si, and Ti;
and D has the definition of C or R or R', with the proviso that D is R or R' if x is 0, and optionally compounds (2) of the formula HR$_2$SiO(R$_2$SiO)$_n$SiR$_2$H where
n is 0 or an integer from 1 to 100,
with organo(poly)siloxanes (3) of the formula R$^3$R$_2$SiO(R$_2$SiO)$_m$SiR$_2$R$^3$ where
R$^3$ is an aliphatically unsaturated hydrocarbon radical of the general formula H$_2$C=CR$^5$(—R$^4$)$_v$—, and,
m is 0 or an integer from 1 to 200 in the presence of at least one hydrosilylation catalyst (4), to form a branched organosilicon compound, and optionally in a second step, equilibrating the resulting branched organosilicon compound with at least one organopolysiloxane (5) selected from the group consisting of linear organopolysiloxanes containing terminal triorganosiloxy groups and linear organopolysiloxanes containing terminal hydroxyl groups.

6. The process of claim 5, wherein said crosslinkable silicone coating composition comprises (A) at least one organosilicon compound having radicals containing one or more aliphatic carbon—carbon multiple bonds, said organosilicon compound having radicals containing one or more aliphatic multiple bonds different from said branched organosilicon antimisting compound, (B) at least one organosilicon compound containing Si-bonded hydrogen atoms, (C) at least one hydrosilylation catalyst, and optionally (D) one or more inhibitors.

7. A crosslinkable silicone coating composition with reduced aerosol formation, comprising (X) at least one antimisting additive described in claim 1, (A) at least one organosilicon compound having radicals containing one or more aliphatic carbon—carbon multiple bonds, different from (X), (B) at least one organosilicon compound containing Si-bonded hydrogen atoms, (C) at least one hydrosilylation catalyst, and optionally, (D) one or more inhibitors.

8. A crosslinkable silicone coating composition with reduced aerosol formation, comprising (X) at least one antimisting additive described in claim 5, (A) at least one organosilicon compound having radicals containing one or more aliphatic carbon—carbon multiple bonds, different from (X), (B) at least one organosilicon compound containing Si-bonded hydrogen atoms, (C) at least one hydrosilylation catalyst, and optionally, (D) one or more inhibitors.

9. A shaped body produced by crosslinking the composition of claim 7.

10. The shaped body of claim 9 which is a coating.

11. The shaped body of claim 9, which is a release coating for tacky substances.

12. A process for producing coatings, comprising applying the crosslinkable composition of claim 7 to a surface to be coated and crosslinking the composition.

13. A process for producing coatings, comprising applying the crosslinkable composition of claim 8 to a surface to be coated and crosslinking the composition.

* * * * *